US006961562B2

(12) United States Patent
Ross (10) Patent No.: US 6,961,562 B2
(45) Date of Patent: Nov. 1, 2005

(54) METHOD AND APPARATUS FOR ACQUIRING, PROCESSING, USING AND BROKERING LOCATION INFORMATION ASSOCIATED WITH MOBILE COMMUNICATION DEVICES

(75) Inventor: Elias N. Ross, Kirkland, WA (US)

(73) Assignee: Openwave Systems Inc., Redwood City, CA (US)

( * ) Notice: Subject to any disclaimer, the term of this patent is extended or adjusted under 35 U.S.C. 154(b) by 462 days.

(21) Appl. No.: 10/176,152

(22) Filed: Jun. 19, 2002

(65) Prior Publication Data

US 2003/0236095 A1 Dec. 25, 2003

(51) Int. Cl.[7] .............................................. H04Q 7/20
(52) U.S. Cl. ................ 455/425; 455/456.3; 455/456.6; 455/456.1; 342/450
(58) Field of Search ............................. 455/456.1–457; 342/450, 458, 463, 465, 419, 428–430, 432

(56) References Cited

U.S. PATENT DOCUMENTS

| | | | | |
|---|---|---|---|---|
| 3,855,571 A | * | 12/1974 | Massa | 340/990 |
| 6,510,381 B2 | * | 1/2003 | Grounds et al. | 701/207 |
| 6,647,257 B2 | * | 11/2003 | Owensby | 455/414.1 |
| 6,716,101 B1 | * | 4/2004 | Meadows et al. | 455/456.1 |
| 2001/0015966 A1 | * | 8/2001 | Casati | 370/338 |
| 2002/0022488 A1 | | 2/2002 | Srinivasan et al. | |
| 2002/0068585 A1 | | 6/2002 | Chan et al. | |
| 2002/0090943 A1 | * | 7/2002 | Kwon | 455/433 |

FOREIGN PATENT DOCUMENTS

WO WO0131966 A1 * 5/2001

OTHER PUBLICATIONS

Natalia Marmasse et al., "Location Modeling-workshop position paper", pp. 121-126, Sep. 30, 2001, XP002250438.

* cited by examiner

*Primary Examiner*—Duc Nguyen
(74) *Attorney, Agent, or Firm*—Blakely, Sokoloff, Taylor & Zafman LLP (57) ABSTRACT

An information broker operates a location server coupled to a wireless network and a wireline network, which acquires and processes information indicating locations of mobile communication devices on the wireless network. The information broker provides the processed information to one or more recipients. The processed information may be provided by the information broker to a recipient in exchange for payment, as part of a business transaction. The raw or processed location related information may include a history of locations of a mobile communication device and times and durations associated with the locations. The processed information may include graphs or maps of geographic areas in which the mobile devices have been located, movement trends, or other behavioral patterns of mobile users. The processed location data can also be used in performing location-based searches and other location-related applications and for customer analysis, among other uses.

42 Claims, 11 Drawing Sheets

| LATITUDE | LONGITUDE | TIME | FLAG |
|---|---|---|---|
|  |  |  |  |

FIG. 12

| REGION NAME | REGION DESCRIPTION ||
|---|---|---|
|  | CENTER | RADIUS |
| "HOME" |  |  |
| "WORK" |  |  |
| "SCHOOL" |  |  |

METHOD AND APPARATUS FOR ACQUIRING, PROCESSING, USING AND BROKERING LOCATION INFORMATION ASSOCIATED WITH MOBILE COMMUNICATION DEVICES

FIELD OF THE INVENTION

At least one embodiment of the present invention pertains to location related services associated with mobile communications devices and, more particularly, to a method and apparatus for acquiring, processing, using and brokering location related information associated with mobile communication devices operating on a wireless telecommunications network.

BACKGROUND

It is becoming increasingly popular to use wireless telecommunications devices such as cellular telephones, personal digital assistants (PDAs), and two-way pagers to access the Internet. Numerous Internet-based services and applications are already available for such mobile devices, among which are a class of services and applications referred to generally as location-based services. Location-based services allow people to use their mobile devices to search for places or things remotely over the Internet, find the fastest route from one place to another, or obtain other useful location-based information. Some mobile devices include their own internal positioning systems to determine their locations, which can be provided to a remote service over the air for use in providing location-based services.

For location-based services, the data used to perform a geographic search or the data released from the mobile device usually includes a point or a geometric area based on the current location of the mobile device. Such data may be relevant when one wants to find a place near one's current location, but often a user may need location-based services relative to some location other than his current location. For example, a person may wish to obtain location information (e.g., an address or directions) for a restaurant at which he had lunch the day before. The place may be located outside the person's current vicinity, or he may not have location-based services accessible from his current location, or there may be no telecommunications coverage at his current location.

SUMMARY OF THE INVENTION

The present invention includes a computer-implemented method, and a corresponding apparatus, wherein the method is characterized as follows: A processing system is used to acquire location related information associated with a plurality of mobile devices that operate on a wireless network. The location related information associated with the plurality of mobile devices is then processed in the processing system and transmitted to a recipient as part of a business transaction, by which payment is received in exchange for transmitting the information.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for acquiring, processing, using and brokering location related information associated with mobile devices on a wireless network are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, an information broker operates a location server coupled to a wireless network and a wireline network, which acquires and processes information indicating locations of mobile communication devices on the wireless network. The information broker provides the processed information to one or more recipients. The processed information may be provided by the information broker to a recipient in exchange for payment, as part of a business transaction. The raw or processed location information may include a history of locations of a mobile communication device and times and durations associated with the locations. The processed information may include graphs or maps of geographic areas in which the mobile devices have been located, movement trends, or other behavioral patterns of mobile users. The processed location data can also be used in performing location-based searches and other location-related applications and for customer analysis, among other uses.

The techniques described herein may be advantageous to wireless telecommunications service providers ("carriers"), parties who provide location-based services to mobile devices (e.g., cellular telephones, PDAs, two-way pagers), and parties interesting in acquiring location related information about mobile device users.

Data corresponding to mobile device locations over time can be stored in a centralized location server as series of places, times, and durations. Locations where certain services were performed for a given mobile device can be flagged in the stored data. Although these location related data are useful to have, they may become quite voluminous and cumbersome to process with thousands or millions of users. Therefore, it is useful to convert these data into a simplified form that is easier to interpret and manage.

Toward that end, note that a given mobile device user tends to remain around certain places, such as his home, his workplace, where he goes out to dinner, etc. Therefore, in certain embodiments of the present invention, location data for each mobile device is used to define one or more geographic regions in which the mobile device is often located. A density metric is assigned to each region, generally corresponding to the frequency with which the mobile device has been in that region. A time decay factor continuously is applied to the density metric of each region, such that older location data become less important than newer location data.

These data can be used for performing geographic searches and other location-based services, which can be independent of a user's current location. In addition, these data may be of interest to third parties which do not necessarily provide location based services, such as for tracking customer behavior.

In embodiments of the present invention, a location server is coupled to a wireless network and a wireline network. The location server acquires location information indicating various locations of each of multiple mobile devices on the wireless network. The location information includes a short-term history of locations of each mobile device and, if desired, times and durations associated with the locations. The location server generates a graph from the location information for each mobile device and defines one or more regions from the graph. Each region represents a geographic area in which the corresponding mobile device has been located. The location server associates each of the regions with a subset of the location information for the mobile device. The location server stores data identifying each region in a storage device in association with the corresponding subset of the location based information. The stored data can be used for performing location-based searches and other location-related services, which may be provided by the location server or a third party. The location server also from time to time updates the graph to adjust for elapsed time and newly detected locations of the mobile device and updates the regions accordingly.

Acquired location related information of mobile devices can also be processed to graph, map, or otherwise identify movement trends and other behavioral patterns of mobile users. Such trends or patterns may be of great interest to various business enterprises or other entities for various purposes. Hence, in certain embodiments, the processed location related information is provided to one or more third parties as part of a business transaction, in which the provider of the information (e.g., the operator or owner of the location server) receives money or other compensation as payment for providing the information. Hence, processed location related information relating to mobile devices effectively becomes a tradable commodity, where the acquirer/processor of the location related information is a broker of the commodity.

To facilitate description, the provider of the processed location related information is assumed to be the owner or operator of the location server, and this party is henceforth referred to herein as the "information broker". In some cases, the information broker may be the wireless telecommunications service provider ("carrier") associated with the wireless network.

Figure 1:
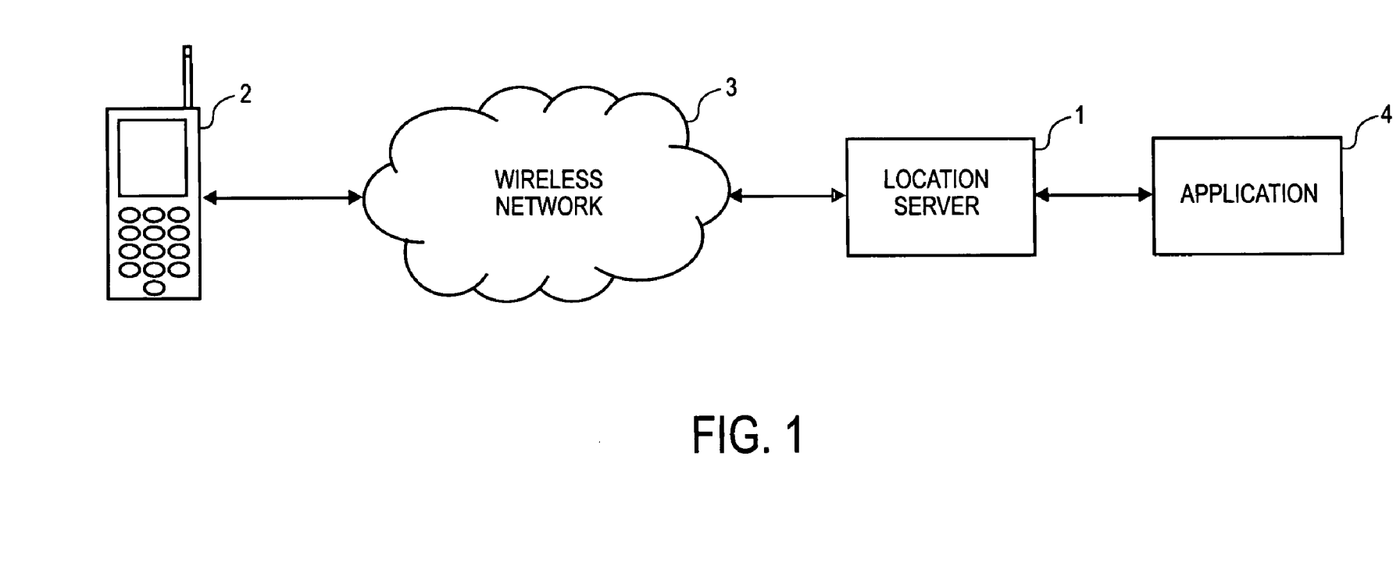
FIG. 1 is a high-level representation of a system in which location-based services are provided to a mobile device over a wireless network.

FIG. 1 is a high-level representation of a system in which location-based services are provided to a mobile device over a wireless network. A mobile device 2 (e.g., a cellular telephone, PDA, or two-way pager) operates on a wireless telecommunications network ("wireless network") 3, along with other mobile devices not shown. Coupled to the wireless network 3 is the location server 1, which performs the operations described above and described further below, such as acquiring and reducing (processing) location based data. A location application 4, which may be remote to the location server 1, communicates with the location server 1 over a network or other link and provides services using processed (reduced) location based data from the location server.

Figure 2:
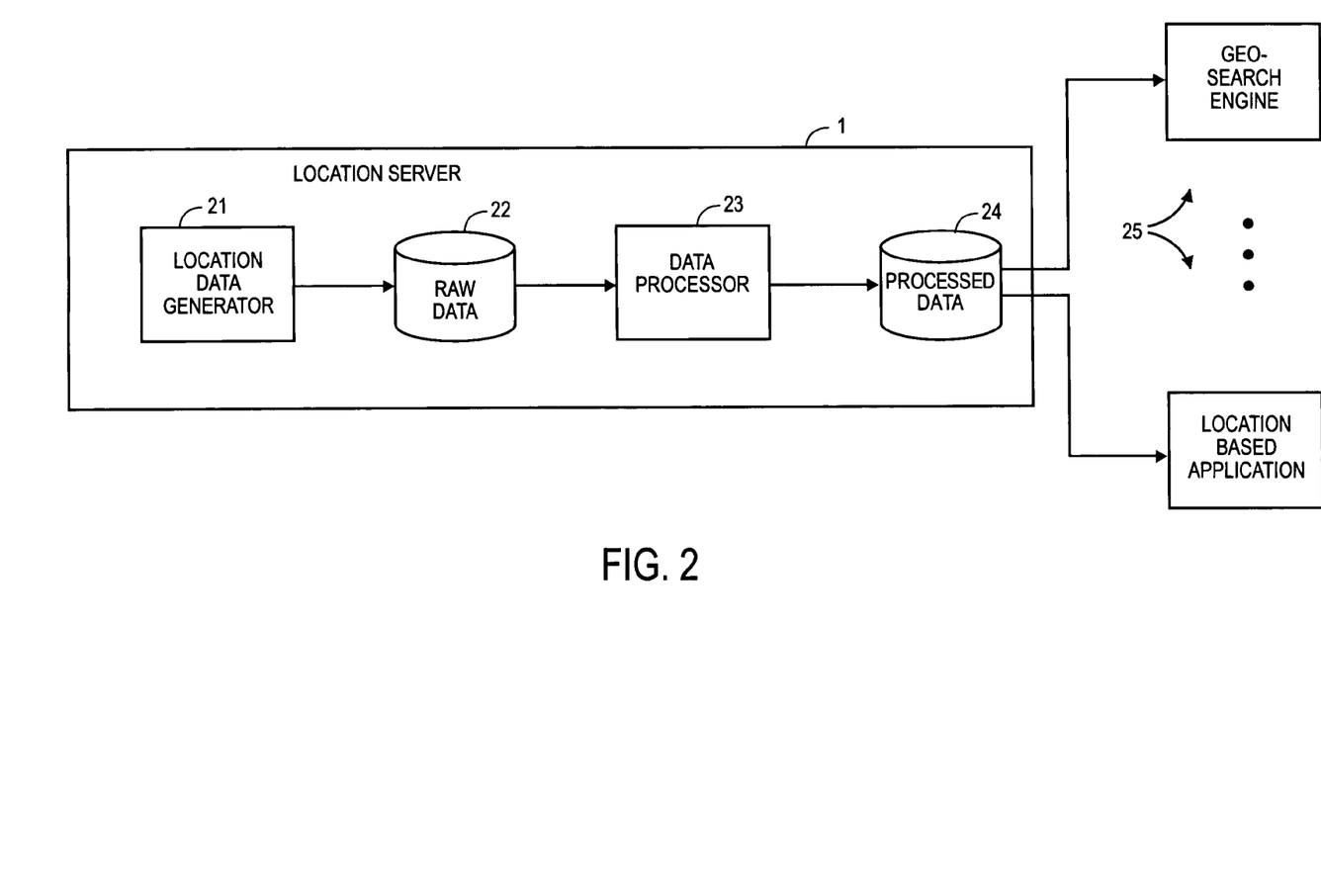
FIG. 2 illustrates the location server of FIG. 1 in greater detail.
Figure 12:
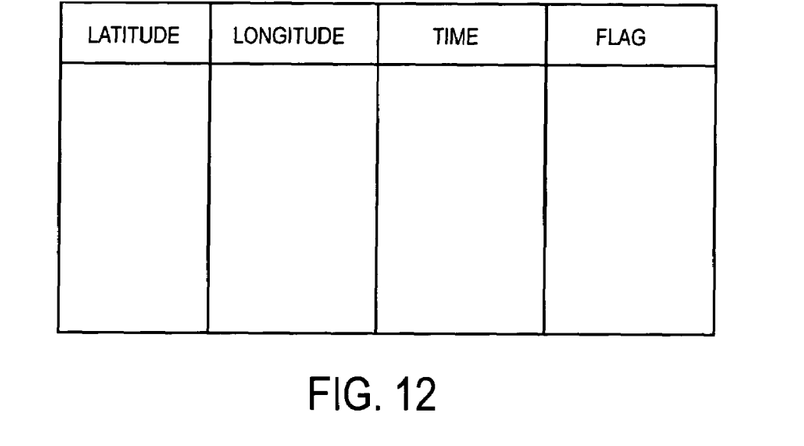
FIG. 12 shows an example of a format for storing location-based data.

FIG. 2 illustrates the location server 1 in greater detail, according to one embodiment. In the illustrated embodiment, the location server 1 includes a location data generator 21, which generates raw location based data 22. The raw data 22 may include, for example, latitude/longitude coordinates of mobile devices on the wireless network, as well as corresponding times of day and durations for each set of coordinates. The location data may alternatively (or cooperatively) be acquired using other components in the wireless network and/or from components within the mobile devices. Alternatively, the raw location based data 22 may be acquired from a third party. FIG. 12 shows one possible format in which the raw location-based data 22 can be stored for a given mobile device. A flag may be set for any data entry representing a location where services were provided to the mobile device. Any of various well-known conventional technologies can be used to acquire the raw location based information, such as conventional global positioning system (GPS) components, for example.

The location server 1 also includes a data processor 23 which inputs the raw data 22 and reduces the raw data 22 to a more usable form, as described above and as further described below. The data in the more usable form are referred to as the processed (or "reduced") data 24. The raw data 22 and the processed data 24 each may be stored in any suitable persistent mass storage device, such as one or more magnetic- or optical-based disk drives. The processed data is then provided to one or more local or remote location based applications 25, such as a geographic search engine, to be used as appropriate by each application. The processed data 24 may be provided to the applications 25 by the location server 1 in response to requests, according to a predefined schedule and/or according to a predefined algorithm.

The location server 1 may be physically implemented by one or more conventional computer systems, such as one or more personal computers (PCs), server class computers, handheld computing devices, or a combination thereof, and which may be distributed on a data network.

Figure 3:
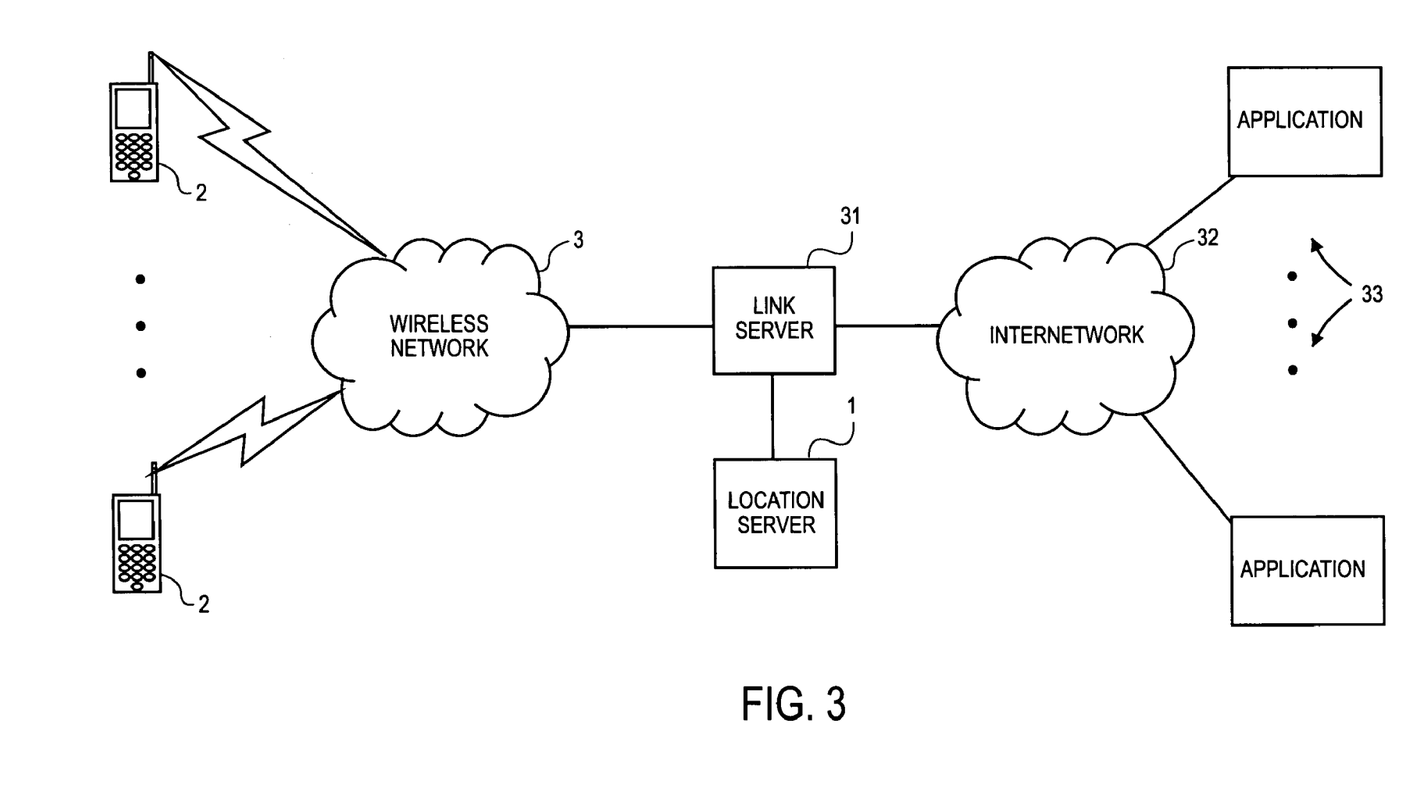
FIG. 3 shows a network configuration in which location-based services and other Internet-based applications are provided to mobile devices over a wireless network.

FIG. 3 shows, in greater detail, an example of a network configuration in which location-based services and other Internet-based applications are provided to mobile devices over a wireless network. A number of mobile devices 2 operate on the wireless network 3. The wireless network 3 is connected through a link server 31 to an internetwork 32, which may be the Internet, for example. Various applications 33 are coupled to the internetwork 32. The link server 31 translates/converts between the languages and protocols used by the mobile devices 2 (e.g., WML and WAP) and those used by the internetwork 32 (e.g., HTML and HTTP), and proxies requests and responses between the mobile devices 2 and the applications 33.

In the illustrated embodiment, the location server 1 is coupled to link server 31. Note, however, that in other embodiments the location server 1 is not necessarily coupled directly to the link server 31. For example, the location server 1 may be directly coupled to the wireless network 3 or to the internetwork 32. In certain embodiments, either or both of the link server 31 and the location server 1 may be operated by the operator of the wireless network 3, i.e., the wireless telecommunications carrier. Note also that the link server 31 and location server 1 can be implemented in a single physical processing device (e.g., computer).

Figure 4:
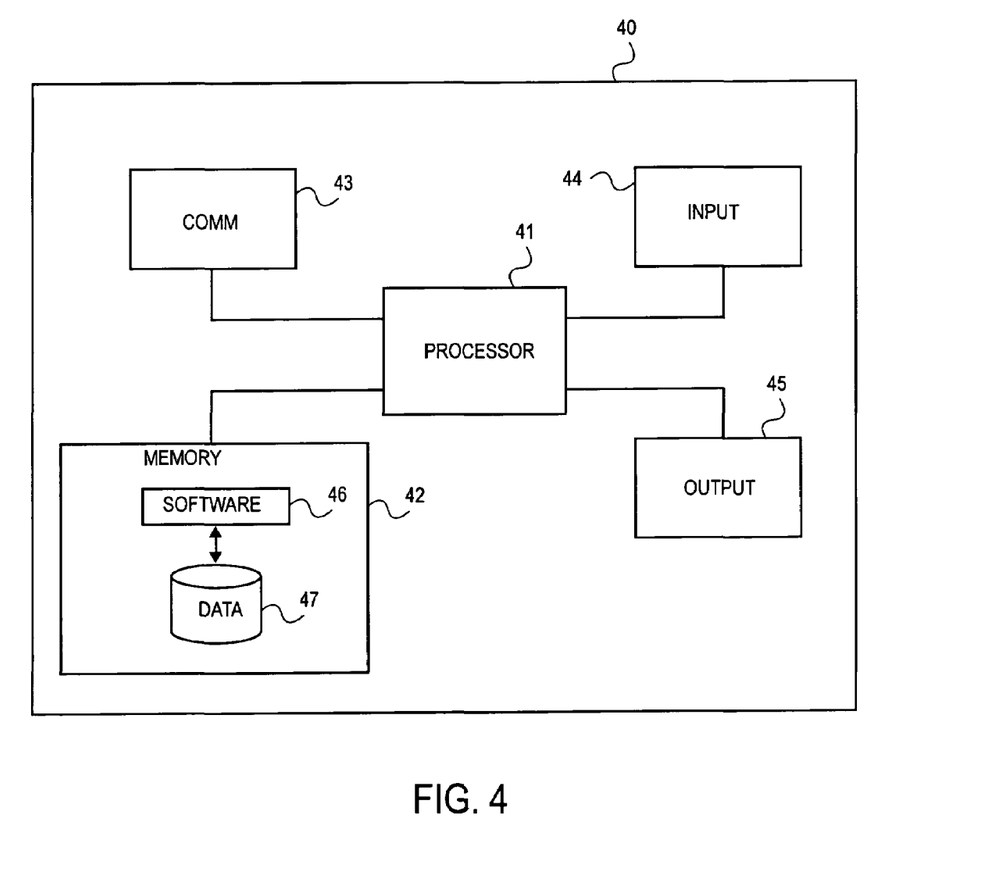
FIG. 4 is a high-level block diagram of a processing system.

FIG. 4 is a high-level block diagram of a processing system representative of any of the processing systems illustrated in FIG. 3, including the location server and/or the link server. As shown, the processing system 40 includes one or more processors 41, memory 42 coupled to the processor 41, one or more data communication devices 43 coupled to the processor 41, one or more input devices 44 coupled to the processor 41, and one or more output devices 45 coupled to the processor 41. The processor(s) 41 may be, or may include, one or more programmable general-purpose or special-purpose microprocessors or digital signal processors (DSPs), application specific integrated circuits (ASICs), programmable logic devices (PLDs), or a combination of such devices.

Each data communication device 43 is a device suitable for enabling the processing system 40 to communicate with remote devices and may be, for example, a conventional modem, a Digital Subscriber Line (DSL) modem, a cable modem, an Ethernet adapter, an Integrated Services Digital Network (ISDN) adapter, a wireless transceiver (e.g., in the case of a mobile device), a satellite transceiver, or the like.

The input devices 44 may include, for example, a keyboard or keypad, a pointing device (e.g., a mouse, trackball, or touchpad) and/or voice input device. The output devices 45 may include a monitor, a printer and/or audio speakers. Note, however, that certain ones of these input/output (I/O) devices may be unnecessary in certain embodiments; for example, a server does not necessarily require I/O devices separate from a communication device if it is not intended to interact with any local user.

The memory 42 may include random access memory (RAM), read-only memory (ROM), flash memory, one or more mass storage devices (e.g., magnetic or optical disks), or the like, or a combination thereof. Stored in the memory 42 are software 46 and data 47. The software 46 may include software which configures the processor to perform the operations of the location server that are described herein. The data 47 may include the raw location based data 22 and/or the processed (reduced) location based data 24, as well as other data.

Figure 5:
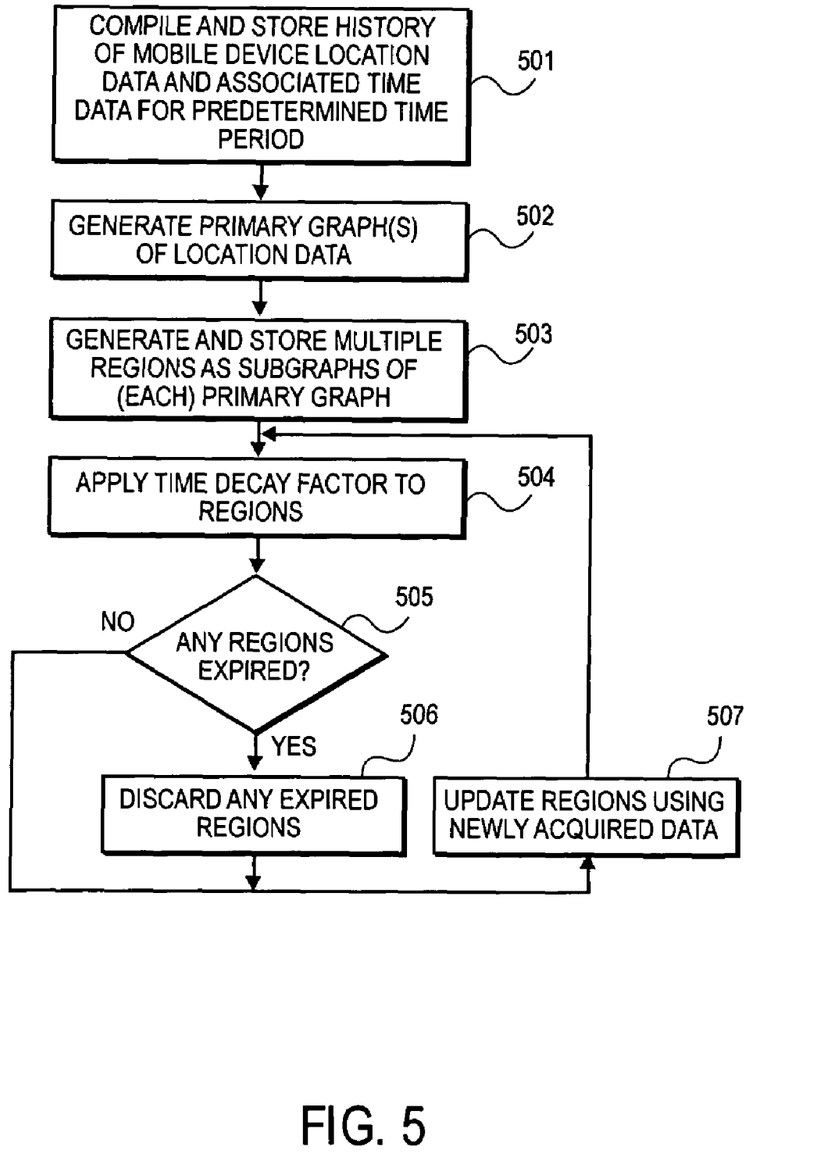
FIG. 5 is a flow diagram illustrating a process for acquiring and reducing location-based data.
Figure 7:
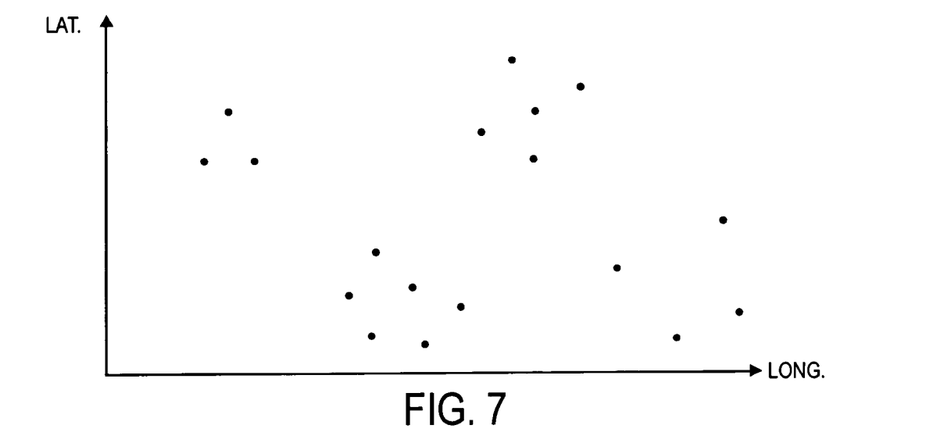
FIGS. 7 through 10 are examples of graphs of location-based data at different stages in the process of FIG. 6.

FIG. 5 shows a process that can be implemented by the location server 1 to acquire and process location-based data, according to one embodiment of the invention. The illustrated process can be used to identify regions in which particular mobile device users tend to be. As a result, geo-based searches referenced to such regions can be carried out, among other applications. At block 501, the location server 1 compiles and stores a history of location data (e.g., geographic coordinates) and corresponding time data (e.g., times of day and durations) for one or more mobile devices for a predetermined time period. At block 502, the location server 1 generates a primary graph of the location data for each of the mobile devices. FIG. 7 shows an example of a simplified representation of such a graph, where the individual points each represent a pair of latitude/longitude coordinates of a given mobile device. Of course, the location data does not necessarily have to be expressed in terms of latitude/longitude; any convenient format may be used. Next, at block 503 the location server 1 defines and stores multiple regions as subgraphs of each primary graph for each mobile device. Each region is defined based upon a subset of the points in a graph and represents a geographic area in which the corresponding mobile device has been located during a given time period. At a more abstract level, the regions defined for a given mobile device give an overall picture of where the user of the device tends to spend his time. This information can be valuable to location based applications and services. Any of various techniques can be used to generate the regions from the primary graph, as discussed further below.

Each of the regions is also assigned a "density" metric, corresponding to the number of location points contained within that region. The density metric can generally be thought of as an indicator of how much time the user of the mobile device spends in that geographic region. At block 504 a time decay factor is applied to the density metric of each of the regions. Hence, older data becomes less important than newer data. If a mobile device user is determined not to be present in a particular region for a significant length of time, this fact will be reflected as a reduction in the density metric of that region. This information may also be useful to certain location based services.

Certain regions may be deemed to expire after a certain length of time if new location data is not acquired for that region for the corresponding mobile device. This approach is embodied in block 505 of the illustrated process, in which a determination is made of whether any of the regions have expired. At block 506 any expired regions are discarded. After block 506, or after block 505 if no regions have expired, block 507 is executed, in which each of the regions is updated using any newly acquired location based data. After block 507, the process repeats from block 504.

Figure 6:
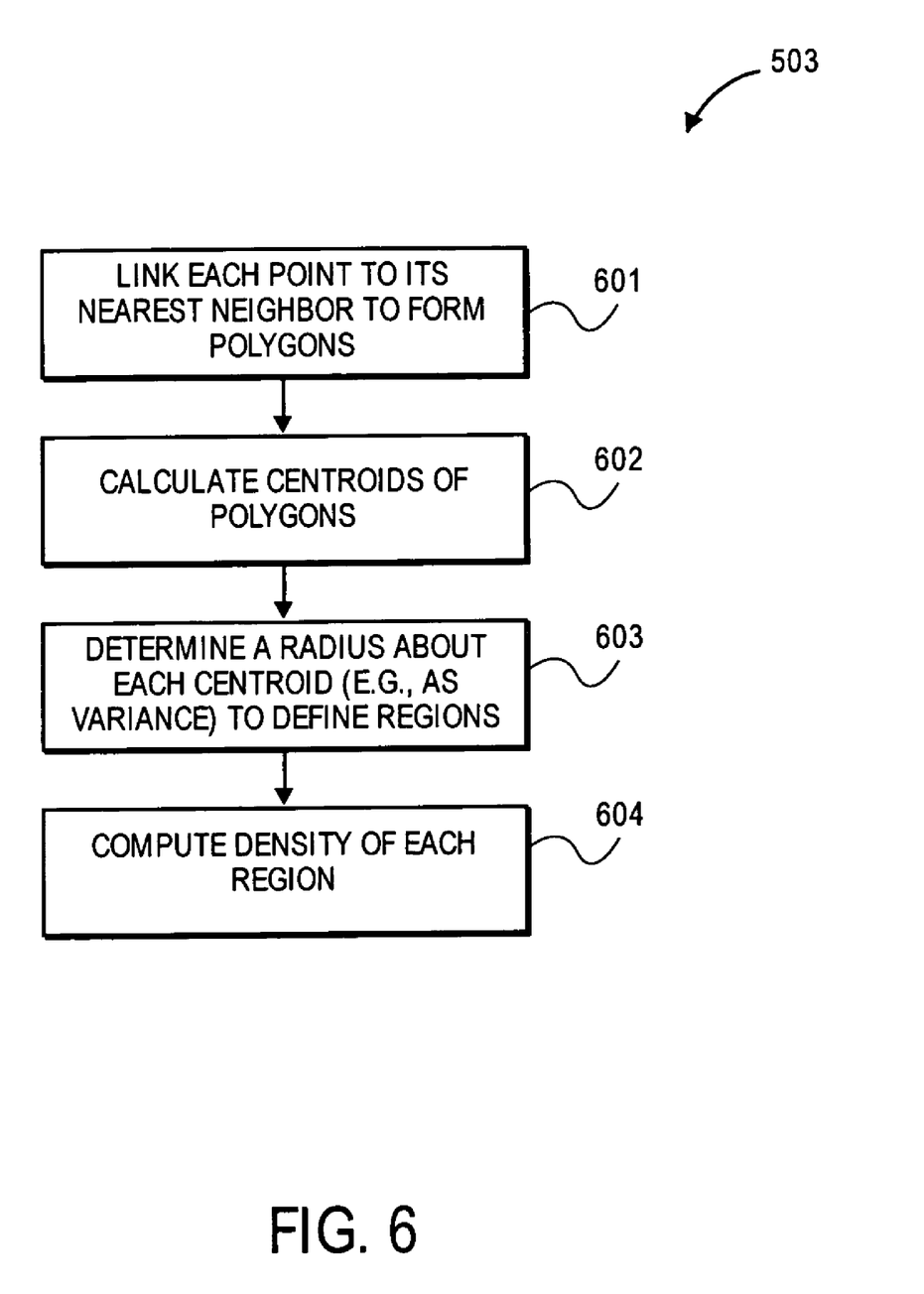
FIG. 6 is a flow diagram illustrating a process for defining geographic regions from location-based data.
Figure 8:
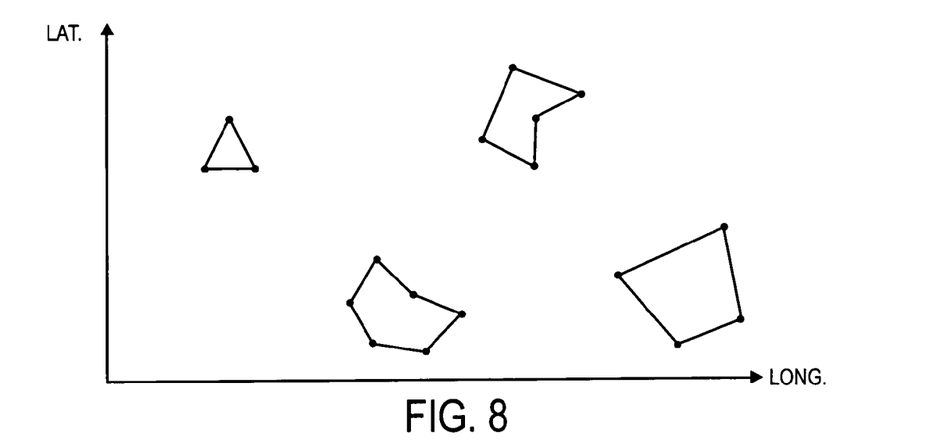
Figure 9:
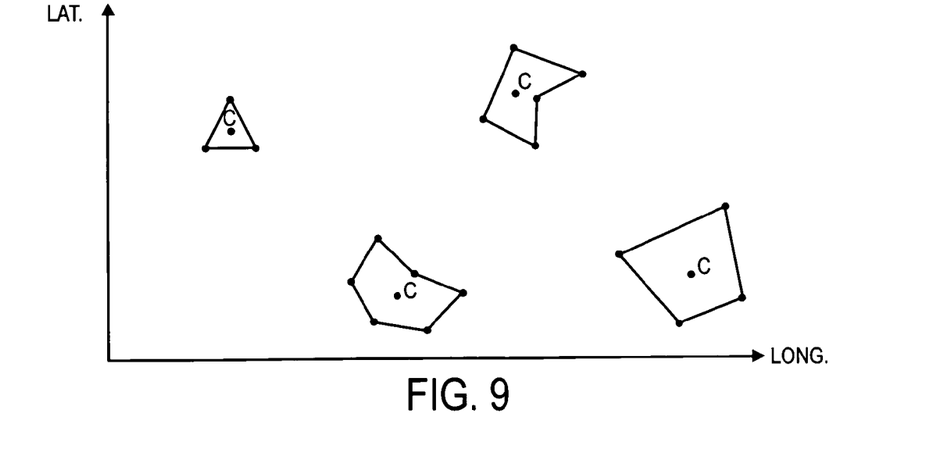
Figure 10:
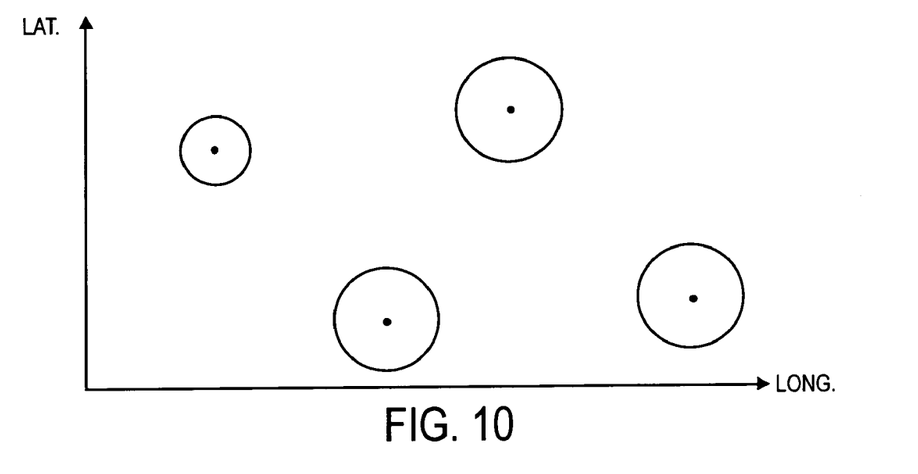
Figure 11:
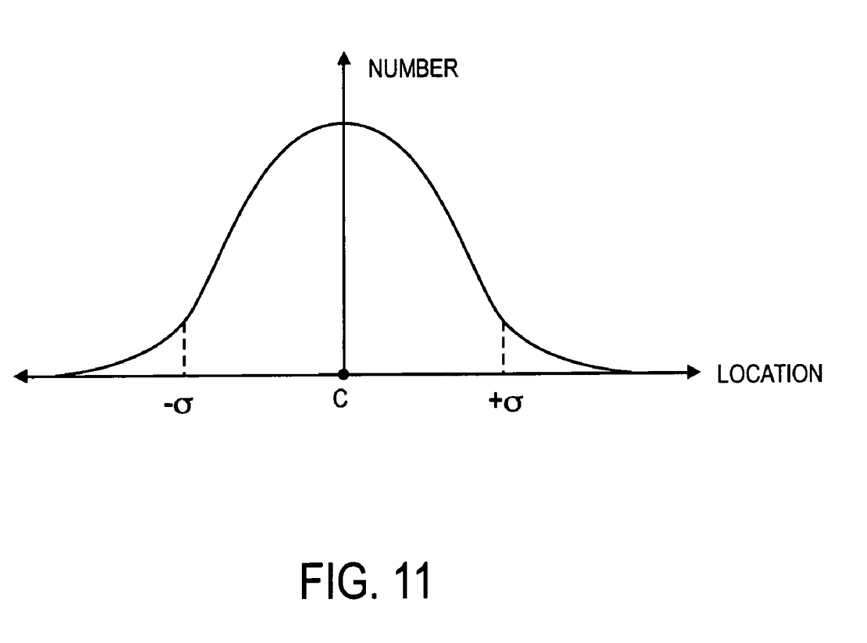
FIG. 11 illustrates a distribution of location data for a particular region.

FIG. 6 shows block 503 in greater detail, according to one embodiment of the invention. Of course, other approaches can be used. At block 601, for a given time period (e.g., 8 AM to 5 PM) and a given mobile device, the location server 1 links each location point to its two nearest neighbor points, to form one or more polygons such as shown in FIG. 8. Any of various forms of the well-known Nearest Neighbor algorithm may be used for example, to identify the nearest neighbors (see, e.g., G. Hjaltason et al., "Ranking in Spatial Databases", Advances in Spatial Databases—4th Symposium, SSD'95; M. J. Egenhofer et al., Lecture Notes in Computer Science 951, Springer-Verlag, Berlin, 1995, pp. 83–95). At block 602 the location server 1 computes the location representing the centroid of each polygon, as shown in FIG. 9. At block 603 the location server 1 determines a radius about each centroid to define a circular region about the centroid. The radius may be a function of the probability distribution of location data about the centroid. For example, referring to FIG. 11, the number of acquired location points of a mobile device about a particular centroid can be expressed as a probability distribution, as shown. Accordingly, the radius about the centroid C can be taken as the variance $\sigma^2$ (or a function thereof), for example, of the location data about the centroid C. FIG. 10 shows an example of the circular regions that might be defined from the centroids and the distribution of data points represented by FIG. 9. At block 604 the location server 1 computes the density metric for each region, corresponding to the number of location points within that region. Any of various algorithms or formulas may be used to compute the density metric; it is simply a numeric indicator of the number of data points within the region.

Note that while the foregoing process is a simple and convenient approach, in other embodiments, non-circular regions may be defined, and any of various other techniques may be used to generate the regions, such as pattern recognition.

It may be desirable to allow users to see their stored location data, in either raw or reduced (simplified) form. A telecommunications carrier may wish to allow some predetermined maximum number of regions to be defined for each user e.g., five to 10 regions per user. Filters can be applied to the regions as well. For example, the defined regions can be weighted based on any of various factors, such as time of day or recentness, for purposes of performing a geographic search.

Figure 13:
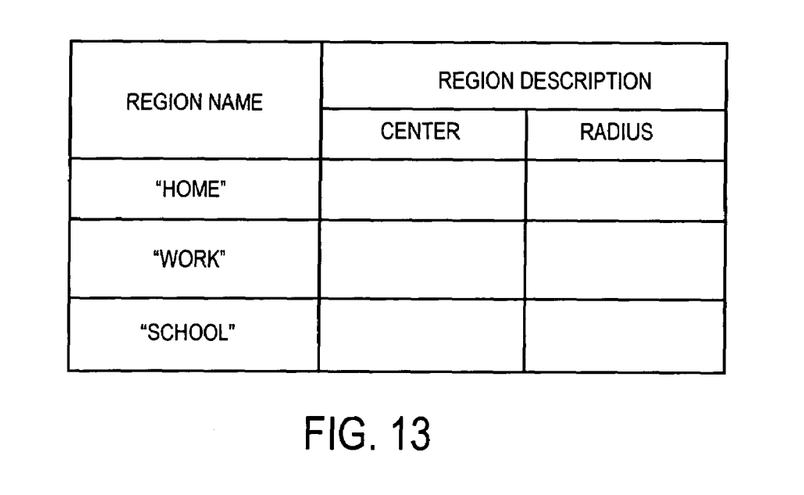
FIG. 13 shows an example of a format for defining and storing regions based on location-based data.

FIG. 13 shows one possible format for storing information describing the regions defined from the primary graph for a mobile device. Each region is defined as center (centroid) and a radius in the illustrated embodiment. Each region may also be assigned a label, such as "home", "work", or "school", which may be assigned by the user of the mobile device. The labels may be assigned by the user, and the location based data made accessible to the user, through a standard World Wide Web page provided by the location server 1 or an associated Web server, for example.

It will be recognized that there are many possible uses for location based data processed in the manner described above. For example, the processed data allows a user of mobile device to request and receive a geographic search for a place relative to one of his defined regions, which is not necessarily the region in which he is currently located. As another example, a user may wish to find social contacts located near his home. Consequently, the user could request and receive a geographic search of other users whose "home" regions overlap the user's "home" region (subject to any applicable privacy restrictions).

Acquired location related information of mobile devices can also be processed in other ways and for other purposes, such as to generate maps or reports of movement trends, shopping patterns, and other behavioral patterns of mobile users. The reports or maps may be based upon individual users or populations of users. Such trends or patterns may be of great interest to various business enterprises or other entities for various purposes. Hence, processed location related information about mobile devices can be provided to one or more third parties as part of a business transaction, in which the provider of the information (the information broker) receives money or other compensation from the third party in exchange for the information. Hence, processed location related information about mobile devices effectively becomes a tradable commodity, where the acquirer/processor of the information is the broker. In the embodiments described above for example, the user may be charged for receiving search results.

As another example, certain companies find it useful to compile information about their customers and to provide incentives to their customers based on their shopping patterns or other behavior. Hence, a mobile device user may enter into an agreement with a business entity, such as a supermarket chain, which is interested in receiving the user's business and/or in knowing where the user shops. The agreement provides that the user will receive discounts or points toward an incentive/reward system from the supermarket chain in return for the user's authorizing the release of his location data to the supermarket chain.

A wireless telecommunications carrier acquires the location data relating to the user and other users and acts as the information broker. The supermarket chain, therefore, enters into an agreement with the carrier to buy the mobile user's location data. For example, whenever the user's location data indicates the user is at a retail location of the supermarket chain, the carrier may notify the supermarket chain of this fact. The supermarket chain then awards the user a discount or points toward an incentive/reward system in response to receiving this notification.

As a variation on the above, the information broker (e.g., the carrier) may maintain a metric (i.e., a variable) for each of a number of businesses which desire their customers' location information. Detected locations of mobile users are compared in the location server 1 to a list of retail locations of these businesses in a geo-database in the location server 1. For each instance in which the location of a mobile user matches a retail location of one of these businesses, the metric associated with that business is incremented by the location server 1. The commission broker awards points to each business based on the value of the business' metric. Hence, the information broker may charge a business for each point it awards to that business, or it may charge a subscription fee. The business, in turn, awards discounts or other incentives to the mobile user based on the points it is awarded by the information broker. Of course, other variations on this approach will be readily apparent from this description.

To implement this approach, the location server 1 may interact with a point-of-sale server of the retail business for purposes of awarding points to the business. This implementation has the benefit of hiding the specific location data of mobile users from the retail business, thereby protecting mobile users' privacy.

Rather than desiring data for specific identified users, a party may be more interested in knowing overall movement trends or other behavior of a population of mobile device users. Likewise, privacy agreements or laws may preclude disclosure of location data about individual users. Accordingly, the techniques described herein can be used to broker location related information about populations of mobile device users.

In certain embodiments, "privacy zones" may be specified by mobile device users. A privacy zone is a geographic area such that the mobile device user does not want his location data to be gathered and/or disclosed when he is in that area. Privacy zones may be defined within the location server 1 in response to inputs from mobile device users.

Figure 14:
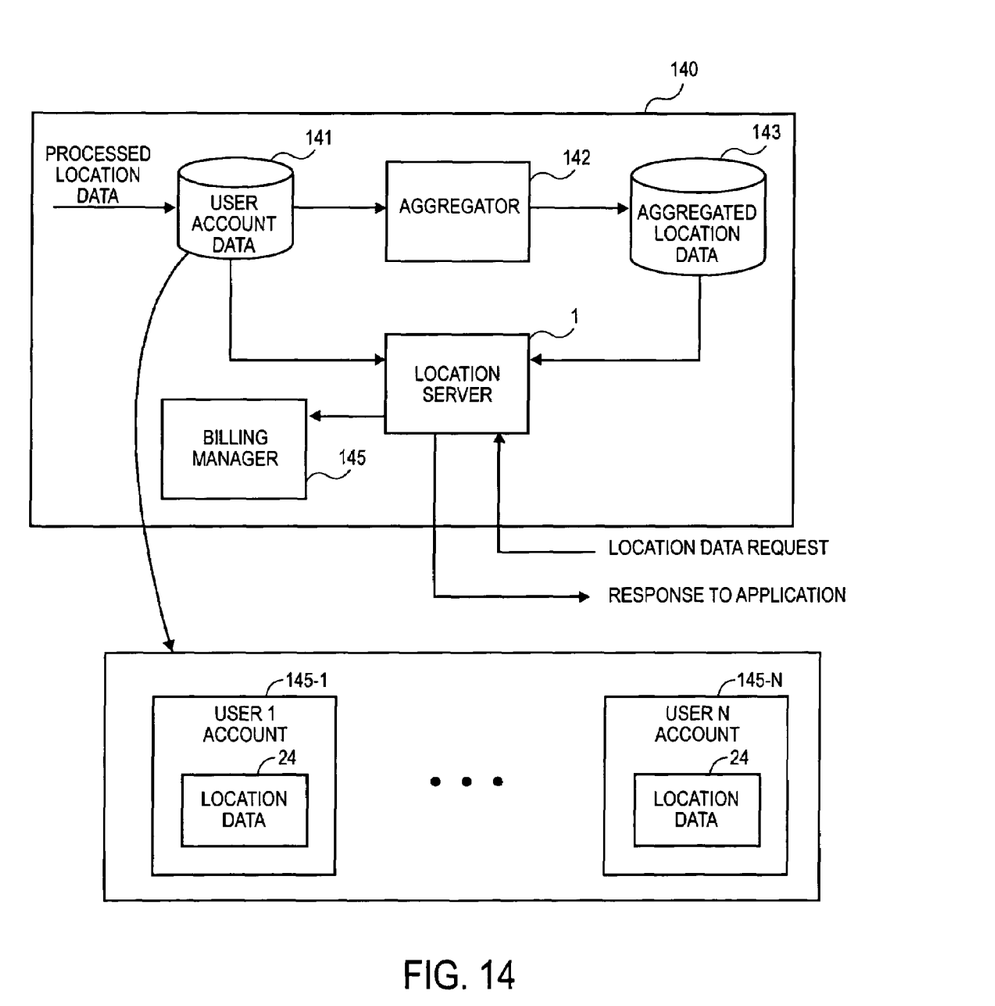
FIG. 14 is a block diagram of a system for servicing requests and billing for providing location-based data.

FIG. 14 shows a system that may be used to implement one or more of the foregoing information brokering scenarios, where one or more entities desire location related information about one or more mobile device users. It will be recognized that there are also various other ways of implementing these scenarios, however. The illustrated system includes a location server 1 such as described above, configured to provide location based data to third parties and to generate billing information associated with a finding such information. The system 140 stores the processed location data 24 in corresponding user accounts 145-1 through 145-N, each corresponding to a different mobile device user. A separate user account 145 is maintained for each user of a mobile device on the wireless network 3, and the processed location based data 24 for a given user is stored within the user account 145 for that user. An aggregator 142 inputs and aggregates the location data of various different users and copies the aggregated data 143 into a separate storage area. Aggregated data 143 may be useful to location based service providers and applications for various purposes, such as determining overall movement trends for mobile device users.

The location server 1 may receive and service specific requests for location data from one or more third parties, such as from the supermarket chain in the above example or from location based applications and providers. Alternatively, the location server 1 may be configured to provide processed location related information when it becomes available, or in response to predetermined events other than requests, or according to a predetermined schedule (e.g., by agreement). The location server 1 provides to the appropriate recipient entity the processed location based data, relating to one or more particular users or aggregated for multiple users, as appropriate. The information may be provided to the recipient electronically (e.g., by e-mail) over a data network such as the Internet, or by any other modality, such as by facsimile, orally by telephone, by written correspondence, etc.

When appropriate, the location server 1 signals a billing manager 145 to update a billing account associated with the recipient. For example, the billing account may be updated each time location related information is provided to the recipient, or when a point is awarded the recipient in the manner described above. The recipient is billed by the information broker according to the recipient's billing account. The information broker subsequently receives payment for providing the information or awarding points.

Certain businesses may wish to acquire maps or graphs relating to the locations or movements of mobile users. Hence, in certain embodiments the location server 1 may generate and provide to a recipient a histogram or other similar graphical representation showing a population density for certain groups or populations of mobile device users. The recipient of this information may be charged based on factors such as resolution, CPU time used, number of samples processed, etc. A request for such information might include a specified geographic area, one or more classes or types of mobile users, and a time period of interest. The response might include an image file or geo-data usable for customer analysis. Hence, the location server 1 may provide a map representing one or more demographic characteristics of mobile device users, such as population density for a specified time period and area.

In another application of the foregoing techniques, instead of merely identifying locations of mobile users, the location system may determine velocities and/or migratory data about mobile users. Velocities can be determined if, for a series of locations, the times the samples taken are also recorded. It might be of interest to compute an average velocity vector over a particular geographic area. Similarly, determinations can be made of what is the typical path a user takes from one location to another, such as from work to home.

Velocity or path information can be represented as a series of vectors. In measuring populations of users, the vectors can be represented graphically, as arrows for example. Population density can be visually indicated in these vectors, such as by arrow thickness.

Note that in certain embodiments, some of the above-described data acquisition and processing operations may be performed in a device other than the location server 1, such as in a mobile device. For example, a mobile device may be equipped with its own internal positioning system (e.g., a GPS receiver) and may therefore acquire and maintain its own history of location data. This information can then be provided to location server 1 over the wireless network 3 periodically, or on request, or whenever the mobile device connects to the wireless network, for example.

Thus, a method and apparatus for acquiring, processing, using and brokering location related information associated with mobile devices on a wireless network have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   using a processing system to acquire location related information associated with a plurality of mobile devices that operate on a wireless network;
   processing the location related information associated with the plurality of mobile devices in the processing system to produce processed location related information, wherein said processing the location related information comprises aggregating the location related information corresponding to at least two of the mobile devices, generating a set of vectors representing movement of the at least two users based on the aggregated information, each of the vectors representing a trend of movement of the at least two users of the mobile devices, and generating a measure of population density corresponding to each vector of the set of vectors;
   transmitting the processed location related information to a recipient as part of a business transaction, wherein said transmitting comprises transmitting data representing the set of vectors to the recipient, and transmitting to the recipient data representing the measure of population density for each vector; and
   receiving payment in exchange for said transmitting as part of the business transaction.

2. A method as recited in claim 1, further comprising using the processing system to maintain a plurality of billing accounts, each associated with a separate potential user of the processed information.

3. A method as recited in claim 2, further comprising using the processing system to update a corresponding one of the billing accounts in conjunction with said transmitting.

4. A method as recited in claim 1, wherein said transmitting comprises transmitting the processed location related information to the recipient over a data network.

5. A method as recited in claim 1, wherein said processing comprises:
   defining a plurality of regions based on location information indicative of a plurality of locations of a mobile device of said plurality of mobile devices, each region associated with a subset of the location information, each region representing a geographic area in which the mobile device has been located; and
   storing in a storage device data identifying each of the regions in association with the corresponding subset of the location information.

6. A method as recited in claim 5, wherein said defining a plurality of regions based on the location information comprises:
   generating a graph from the location information; and
   identifying the plurality of regions from the graph.

7. A method as recited in claim 5, wherein each region has a metric associated therewith, the metric corresponding to a number of recorded locations of the mobile device in the corresponding region.

8. A method as recited in claim 7, wherein said processing comprises updating the location information associated with one or more of the regions to account for elapsed time.

9. A method as recited in claim 8, wherein said updating comprises applying a time decay factor to the metric associated with the region.

10. A method as recited in claim 1, wherein said processing the location related information comprises:
   aggregating at least a subset of the location related information which satisfies a specified criterion, the criterion corresponding to a demographic characteristic of users of said at least some of the devices; and
   generating a map based on the aggregated location related information, such that the map is indicative of said demographic characteristic.

11. A method as recited in claim 1, wherein said data representing the set of vectors is for use by the recipient in generating a visual display in which each vector is represented as a line segment and the measure of population density for each vector is represented by a thickness of the corresponding line segment.

12. A method as recited in claim 1, further comprising maintaining a metric associated with a place and an entity;
   wherein said processing the location related information comprises:
   detecting at least one of the mobile devices being in proximity to the place by using the location related information associated with the mobile device and data indicating a location of the place; and
   updating the metric in response to a predetermined number of instances of detecting at least one of the mobile devices being in proximity to the place; and
   awarding a value to the entity based on the metric.

13. A method as recited in claim 12, wherein said receiving payment comprises receiving payment in exchange for awarding the value.

14. A computer-implemented method comprising:
   acquiring aggregated location related information indicative of a plurality of locations of a plurality of mobile devices on a wireless network;
   defining a plurality of regions based on the aggregated location related information, each region associated with a subset of the aggregated location related information, each region representing a geographic area in which at least two of the mobile devices have been located;
   storing in a storage device data identifying each of the regions in association with the corresponding subset of the location related information; and
   generating a map based on the aggregated location related information wherein the map represents a demographic characteristic of users of said at least some of the devices comprising a population density of users of said at least some of the devices.

15. A method as recited in claim 14, further comprising updating the stored data based on additional location related information identifying one or more locations of at least one of the mobile devices.

16. A method as recited in claim 14, wherein said defining a plurality of regions based on the aggregated location related information comprises:
   generating a graph from the aggregated location related information; and
   identifying the plurality of regions from the graph.

17. A method as recited in claim 14, wherein said acquiring aggregated location related information comprises acquiring a short-term history of locations of at least one of the mobile devices.

18. A method as recited in claim 17, wherein said acquiring aggregated location related information comprises acquiring times and durations associated with the locations.

19. A method as recited in claim 14, further comprising assigning a user-specified label to at least one of the regions.

20. A method as recited in claim 14, wherein each region has a metric associated therewith, the metric corresponding to a number of recorded locations of at least one of the mobile devices in the corresponding region.

21. A method as recited in claim 20, further comprising updating the location related information associated with one or more of the regions to account for elapsed time.

22. A method as recited in claim 21, wherein said updating comprises applying a time decay factor to the metric associated with the region.

23. A method as recited in claim 14, further comprising weighting the stored data representing one or more of the regions according to a predetermined criterion.

24. A method as recited in claim 23, wherein the predetermined criterion is a time of day at which at least one of the mobile devices was at one or more locations associated with a region.

25. A method as recited in claim 23, wherein the predetermined criterion is a duration for which at least one of the mobile devices was at one or more locations associated with a region.

26. A method as recited in claim 23, wherein the predetermined criterion corresponds to the number of times that at least one of the mobile devices was at one or more locations within a region.

27. A method as recited in claim 14, further comprising using the stored location related information associated with one or more of the regions to perform a search to locate an entity of a specified type in proximity to one or more of the regions.

28. A method as recited in claim 14, further comprising:
   receiving a search request from a user of at least one of the mobile devices, the search request representing a request to locate an entity of a specified type in proximity to a point, wherein the point is not a present location of the at least one of the mobile devices; and
   using the stored data representing one or more of the regions as a basis for a search to locate the entity.

29. A method as recited in claim 28, wherein said storing comprises storing data identifying each of the regions in association with the corresponding subset of the location related information and further in association with a user account of a user of at least one of the mobile devices.

30. A computer-implemented method comprising:
   acquiring location information indicative of locations of a plurality of mobile devices that operate on a wireless network;
   aggregating the location related information associated with two or more of the mobile devices;
   generating a map based on the aggregated information, wherein the map represents a demographic characteristic of users of the at least some of the devices comprising a population density of users of the at least some of the devices; and transmitting information representing the map to a recipient as part of a business transaction; and receiving payment in exchange for the transmitting information representing the map as part of the business transaction.

31. A method as recited in claim 30, wherein said aggregating comprises aggregating the stored location related information which satisfies a specified criterion, such that the map is indicative of said criterion.

32. A method as recited in claim 31, wherein the criterion is specified in a request for the processed location related information.

33. A method as recited in claim 32, wherein the criterion is from the list consisting of: a geographic area, a type of mobile device user, and a time period.

34. A computer-implemented method comprising:

acquiring location information indicative of locations of a plurality of mobile devices that operate on a wireless network;

aggregating the location information; and generating a set of vectors representing an overall trend of movement of at least two users of the mobile devices based on the aggregated location information, wherein each of the vectors represents an overall trend of movement of a plurality of users of the mobile devices, and wherein said acquiring and said aggregating the location information further comprises generating a measure of population density corresponding to each vector of the set of vectors.

35. A method as recited in claim 34, wherein said data representing the set of vectors is for use by the recipient in generating a visual display in which each vector is represented as a displayed feature and the measure of population density for each vector is represented by a characteristic of the displayed feature.

36. A method comprising:

aggregating the location related information associated with a plurality of mobile devices that operates on a wireless network;

maintaining a metric associated with a place and an entity;

detecting at least one of the mobile devices being in proximity to the place, based on the location related information associated with the at least one of the mobile devices and data indicating a location of the place;

updating the metric in response to detecting a predetermined number of instances of the at least one of the mobile devices being in proximity to the place;

awarding a value to the entity based on the metric; and generating a map based on the aggregated location related information wherein the map represents a demographic characteristic of users of said at least some of the devices comprising a population density of users of said at least some of the devices.

37. A method as recited in claim 36, further comprising receiving payment in exchange for awarding the value to the entity.

38. A method as recited in claim 37, wherein said receiving payment comprises receiving payment from the entity or a party associated therewith.

39. A method as recited in claim 37, wherein the entity is a retail entity, and wherein said awarding a value comprises using a transaction server to maintain said value in association with information identifying the retail entity, the method further comprising using the transaction server to communicate over a network with a remote server associated with the retail entity.

40. A method as recited in claim 39, wherein the remote server is associated with a point of sale transaction system of the retail entity.

41. A method as recited in claim 36, wherein each said value is for use by the associated entity as part of a business incentive program directed to customers of said entity.

42. A system comprising:

means for acquiring location related information associated with a plurality of mobile devices that operate on a wireless network;

means for processing the location related information associated with the plurality of mobile devices to produce processed location related information, wherein said processing the location related information comprises aggregating the location related information corresponding to at least two of the mobile devices, generating a set of vectors representing movement of the at least two users based on the aggregated information, each of the vectors representing a trend of movement of the at least two users of the mobile devices, and generating a measure of population density corresponding to each vector of the set of vectors; and means for transmitting the processed location related information to a recipient as part of a business transaction, wherein said transmitting comprises transmitting data representing the set of vectors to the recipient, and transmitting to the recipient data representing the measure of population density for each vector.

* * * * *